L. T. WEISS.
REWINDING MACHINE FOR FISHING LINES.
APPLICATION FILED DEC. 16, 1918.
1,310,816.
Patented July 22, 1919.
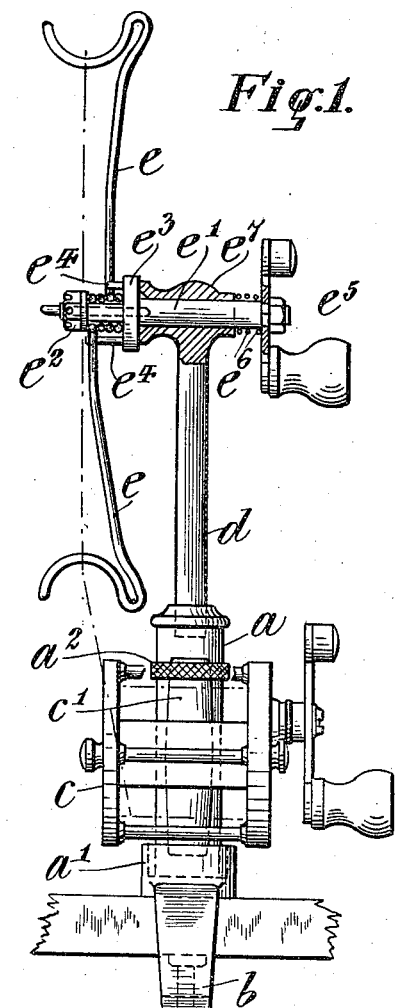
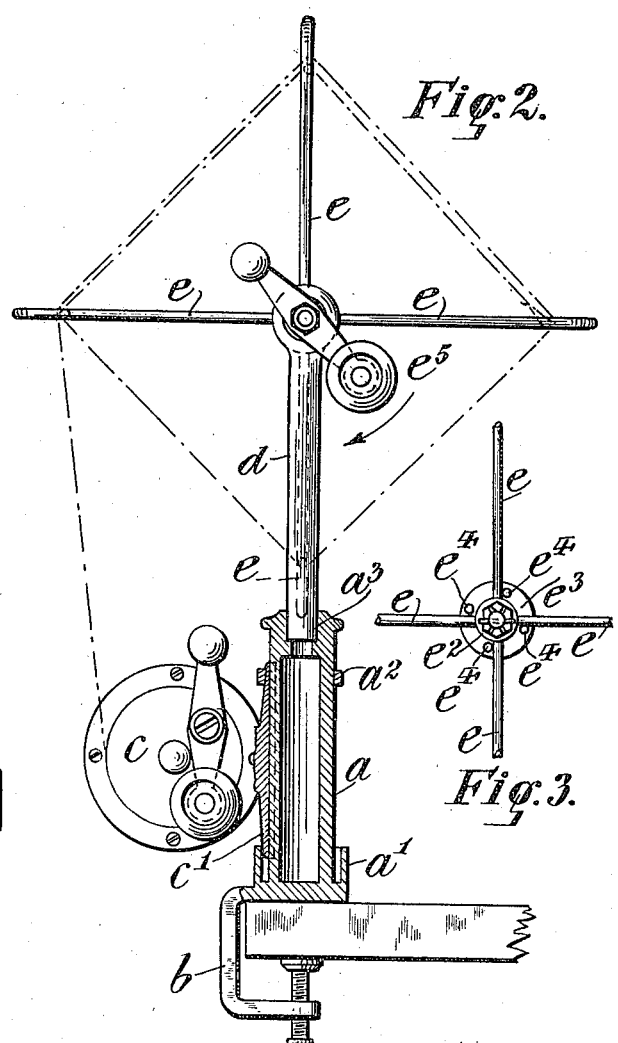
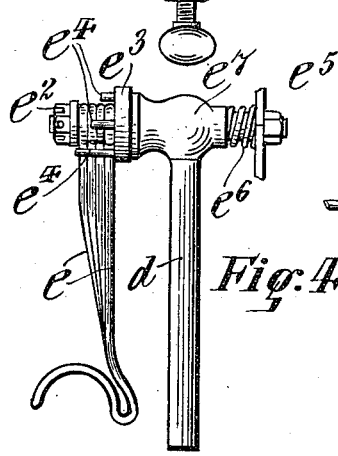
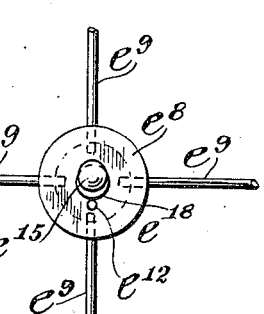
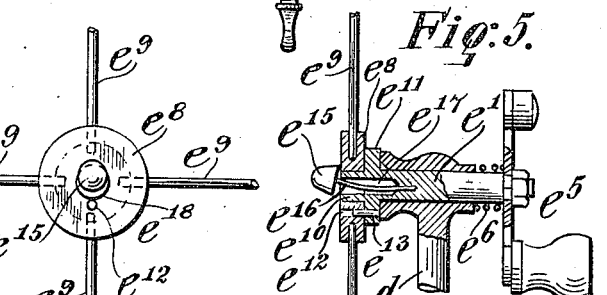
INVENTOR
Louis T. Weiss
BY
Redding, Greeley & Goodlett
ATTORNEYS

UNITED STATES PATENT OFFICE.

LOUIS T. WEISS, OF BROOKLYN, NEW YORK.

REWINDING-MACHINE FOR FISHING-LINES.

1,310,816.      Specification of Letters Patent.      Patented July 22, 1919.

Application filed December 16, 1918. Serial No. 266,918.

*To all whom it may concern:*

Be it known that I, LOUIS T. WEISS, a citizen of the United States, residing in the borough of Brooklyn of the city of New York, in the State of New York, have invented certain new and useful Improvements in Rewinding-Machines for Fishing-Lines, of which the following is a specification, reference being had to the accompanying drawing, forming a part hereof.

The angler who has proper regard for the implements of his sport takes the precaution to dry out his fishing line after it has been used and wetted. For this purpose he sometimes winds off the line from the fishing reel upon widely separated pegs. Sometimes he rewinds the line from the fishing reel upon a drying reel. The first mentioned procedure is not always convenient and often exposes the line to injury. The last mentioned procedure is more desirable because the drying reel can be put in any convenient and safe place during the drying, but unless the angler has the assistance of some other person to hold one reel or the other he is generally put to much trouble to hold the fishing reel securely while he is winding off the line upon the drying reel. Frequently the fishing reel, in the course of operation, falls from the table or chair on which it is placed to the floor and suffers injury thereby. It is well known, in fact, that most of the injuries of fishing reels are caused in this way. It is the object of this invention to provide a rewinding machine which shall be readily available for the use of the angler in drying out his lines, shall not be unduly expensive, and shall be capable of being packed readily in the angler's kit so that it can be transported from one place to another, and shall provide for the secure and convenient holding of the fishing reel and the drying reel during the transfer of the line from one to the other. The invention will be more fully explained hereinafter with reference to the accompanying drawing in which it is illustrated, and in which—

Figure 1 is a view in elevation and partly in section of one form of mechanism which embodies the invention.

Fig. 2 is a view of the same as seen from the right hand in Fig. 1, also partly in section.

Fig. 3 is a detail view of the winding reel shown in Figs. 1 and 2.

Fig. 4 is a detail view showing the drying reel collapsed.

Figs. 5 and 6 are detail views showing a winding reel which is readily removable but is not collapsible.

The machine is designed both with reference to its being packed in a small compass and with reference to its being secured conveniently in position for operation. The vertical standard $a$, which corresponds generally to the handle or reel section of a fishing rod, is provided at its lower end with a clamp $b$ by which the machine can be secured conveniently to a board or table top. The standard is preferably cylindrical and is provided with a socket $a'$ and a sliding ring $a^2$, generally similar to the corresponding socket and ring of the reel section of a fishing rod, so that the fishing reel $c$, of ordinary construction, having the usual arm or base $c'$, can be secured firmly and readily to the standard. In the upper end of the standard $a$ is formed a socket $a^3$ which is adapted to receive with a snug working fit the lower end of a pillar $d$ to support the drying reel. The latter may be of any suitable construction. As shown in Figs. 1, 2, 3 and 4, it is collapsible, having wire arms $e$ which are looped about a shaft $e'$ and are retained thereon by a nut $e^2$. A collar $e^3$ on the shaft is provided with pins $e^4$ parallel with the axis of the shaft, but of successively increasing length so that each arm $e$ shall be stopped in its proper relative position when the reel is set up and in operation, while all of the arms can be swung together, as shown in Fig. 4, into substantial parallelism with and in close proximity to the pillar $d$. The shaft $e'$ has a suitable bearing in the upper end of the pillar $d$ and at the end opposite the reel is provided with a suitable handle $e^5$ and, it may be, with a coiled spring $e^6$ to hold the collar $e^3$ snugly against the end of the bearing $e^7$.

It may be preferred to have a rigid or noncollapsible but readily removable drying reel. Such a reel and devices for securing it to the shaft $e'$ are shown in Figs. 5 and 6. The reel has a hub $e^8$ to which the arms $e^9$ are secured. The hub $e^8$ slips upon the reduced end $e^{10}$, of the shaft $e$, against a collar $e^{11}$, having a hole $e^{12}$ to engage a pin $e^{13}$ fixed in the collar $e^{11}$ so that the reel shall be rotated positively with the shaft. The reel may be held on the shaft by a button $e^{15}$ carried by a spring $e^{16}$ which is located in a recess $e^{17}$ in the shaft. The button $e^{15}$ is of such a size as to pass through an aperture $e^{18}$ in the hub $e^8$ and the spring $e^{16}$ has such a set that the button is held normally but yieldingly at one side so that it overlaps the hub $e^8$ and prevents its accidental removal from the shaft.

In the use of the machine the standard $a$ is secured in position on a convenient table or board, the fishing reel $c$ is secured thereto, and the pillar $d$, with its reel, is placed in position. The end of the fishing line is then made fast to one of the arms of the drying reel, which is then rotated to wind off upon itself the line from the reel. The skeleton construction of the winding reel permits the air to come in contact with all parts of the line and carry off the moisture held thereby. When the line has been sufficiently dried out it may be retransferred to the fishing reel. During both of these operations, both the fishing reel and the drying reel are supported securely and the transfer of the line from one reel to the other is effected quickly.

I claim as my invention:

A vertical standard provided at its lower end with a clamp for securing it in position, with a sliding ring for securing a fishing reel thereon, and at its upper end with a socket, a pillar seated at its lower end in said socket and provided at its upper end with a bearing, a shaft mounted in said bearing and provided at one end with an operating handle, and a drying reel mounted detachably on the other end of the shaft, the standard, pillar, shaft and drying reel being readily separable to permit close packing.

This specification signed this 13th day of December, A. D. 1918.

LOUIS T. WEISS.

Copies of this patent may be obtained for five cents each, by addressing the "Commissioner of Patents, Washington, D. C."